United States Patent [19]
Holbrook

[11] Patent Number: 5,655,004
[45] Date of Patent: Aug. 5, 1997

[54] METHOD AND APPARATUS FOR DETECTION OF CELLULAR PHONE FRAUD

[76] Inventor: William F. Holbrook, Berth 200X, #14, Wilmington, Calif. 90744

[21] Appl. No.: 439,599

[22] Filed: May 12, 1995

[51] Int. Cl.$^6$ .................................................. H04Q 7/22
[52] U.S. Cl. .................................................. 455/411
[58] Field of Search .................................. 379/58, 59, 61, 379/62, 63; 455/33.1, 54.1, 54.2; 380/23; 340/825.3, 825.34

[56] References Cited

U.S. PATENT DOCUMENTS

| | | | |
|---|---|---|---|
| 4,639,550 | 1/1987 | Yamagawa et al. | 379/62 |
| 4,955,049 | 9/1990 | Ghisler | 379/58 |
| 5,249,230 | 9/1993 | Mihm, Jr. | 380/23 |
| 5,280,521 | 1/1994 | Itoh | 379/58 |
| 5,309,501 | 5/1994 | Kozik et al. | 379/58 |
| 5,335,265 | 8/1994 | Cooper et al. | 379/59 |
| 5,335,276 | 8/1994 | Thompson et al. | 380/21 |
| 5,335,278 | 8/1994 | Matchett et al. | 380/23 |
| 5,343,529 | 8/1994 | Goldfine et al. | 380/23 |
| 5,557,676 | 9/1996 | Naslund et al. | 379/59 X |

*Primary Examiner*—Curtis Kuntz
*Assistant Examiner*—G. J. Oehling
*Attorney, Agent, or Firm*—Oppedahl & Larson

[57] ABSTRACT

A request for communication service between a mobile communication device, e.g., a cellular telephone, and a recipient is authenticated using a request for service message that includes an identification code specific to the mobile communication device and a transmitted authentication code which represents a cumulative total of the prior usage of the mobile communication device. The transmitted authentication code is received at a central processing facility and compared to a stored authentication code for the mobile communication device. Communication is initiated between the mobile communication device and the recipient if the transmitted authentication code and the stored authentication code match within established tolerances. Finally, at the end of the communication, the stored authentication code and the authentication code maintained by the mobile communications device are both updated to reflect the additional usage of the mobile communication device for comparison upon receipt of the next service request message from the mobile communication device. Preferably, the authentication code consists of the cumulative duration of all calls completed by the requesting mobile communications device. This authentication method can be accomplished using an apparatus for mobile, wireless communication with a remote recipient.

8 Claims, 2 Drawing Sheets

METHOD AND APPARATUS FOR DETECTION OF CELLULAR PHONE FRAUD

BACKGROUND OF THE INVENTION

This application relates to a method and apparatus for detection of fraudulent usage of mobile communications in general, and cellular telephone fraud in particular.

Cellular telephone fraud has become a significant factor in the mobile communications market. High-tech thieves are able to detect the identification codes assigned to legitimate telephone users, and then program these same codes into additional phones. Because the basic cellular system was set up to initiate a call based upon receipt of only these identification codes, many fraudulent calls may be completed before a heavy-usage report triggers detection of the fraudulent "cloning" of a user's number.

Various solutions to this problem have been proposed. One solution which has been implemented in some cellular markets is the use of a personal identification number (PIN). The legitimate cellular subscriber inputs his PIN as part of the call initialization procedure. This number is checked against a stored value in the central office of the mobile telephone system, and the call is initiated only if the transmitted PIN matches the stored value.

This approach has some success in reducing the level of cloning. Moreover, it is advantageous because it works with existing telephones since all the programming and hardware modifications needed can be done at the central office location. This approach is not, however, without its problems. First of all, many customers dislike having to press additional digits as part of each call, while others simply have trouble remembering their PIN, requiring frequent modification of phone company records to provide modified PIN's.

There is also the problem that the PIN is dialed at a time when the call is already counted by the system as having begun. Thus the user is already paying for the call at the time when the system requests dialing of a PIN code. This increases the total cost of each cellular telephone call.

Forcing a customer base of users who previously were able to place calls without having to worry about PIN codes to start dialing PIN codes is not easy, but it is particularly troublesome for the users who place data or fax calls using a modem connected to a cellular telephone. With many data or fax systems it is not easy to add a PIN code to the dialing sequence. Typically one has to blindly introduce a fixed delay in the dialing string prior to generating the PIN tones, while the actual delay prior to the system's request that the user dial a PIN code varies unpredictably and may be shorter or longer than the fixed delay. And with some modem/cellular connections it is simply impossible to program the modem to generate DTMF tones after the modem equivalent of the "send" key has taken place.

The security benefit of PIN codes is limited. The ESN and mobile telephone number are transmitted unencrypted over a cell control channel, and it is the monitoring of this channel that permits most present-day phone-cloners to accomplish their nefarious ends. The PIN code, in contrast, is transmitted over a voice channel, and the particular voice channel used is determined on the fly in a negotiation that takes place between the cell site and the phone, over the control channel. Thus, a determined phone-cloner would have to develop gear that not only copies down the data flowing over the control channel, but would also have to monitor the appropriate voice channel to learn the PIN code. Thus, the use of a PIN code only protects against fraudulent calls placed by phone-cloners who are unable to monitor two channels at the same time. With the ever increasing numbers of cellular phones, however, the total number of opportunities is large and cloning remains a problem.

Other solutions, generally of much greater complexity, to the problem presented by cloning has also been suggested. For example, U.S. Pat. No. 5,335,265, which is incorporated herein by reference, describes a system which detects cloning by isolating "temporal and spatial anomalies" in the telephone usage pattern. This system stores information about the location and times of calls being made on a subscriber number and then checks subsequent calls to determine if they could reasonably be made with the same telephone. For example, calls that originate only several minutes apart, but hundreds of miles apart, would trigger a fraud alert in the system. This system, like the use of PIN numbers, has the advantage that it requires no modification to equipment already in the field. On the other hand, many subscribers would consider it an infringement on their privacy to have such detailed records kept on their calling patterns. Moreover, the volume of data storage space required for such a system and the hardware necessary to make this stored data available to cellular service providers throughout the country could well be prohibitive.

A similar system is described in U.S. Pat. No. 5,309,501, which is incorporated herein by reference. In this system, certain system states such as the attachment/detachment status of a mobile unit, service request and cancel location are stored at the central office, and any incoming requests from the same phone are checked for "unlikely events." Examples of "unlikely events" include attempting an attachment (detachment) when the identified mobile unit is already attached (detached), receipt of a service request while the unit is detached; or receipt of a cancel location message when a call is in progress. Again, this system requires no update of equipment in the field. It does, however, require substantial data storage. Moreover, this system, like that described in U.S. Pat. No. 5,335,265 provides only an administrative warning, and does not provide an immediate mechanism for refusing to initiate a call on the fraudulent phone while maintaining service to the legitimate phone using the same access codes.

It is the object of the present invention to provide a reliable, yet relatively uncomplicated system for increasing the security of cellular phone system which operates without the need for user participation.

It is a further object of the present invention to provide such a system which permits immediate detection and refusal of fraudulent calls, while permitting continuing service to the legitimate user.

SUMMARY OF THE INVENTION

These and other objects of the invention are achieved through a method for authenticating a request for communication service between a mobile communication device, e.g., a cellular telephone, and a recipient in which a request for service message that includes an identification code specific to the mobile communication device and a transmitted authentication code which represents a cumulative total of the prior usage of the mobile communication device is received from the mobile communication device at a central processing facility. The transmitted authentication code is compared to a stored authentication code for the mobile communication device and communication is initiated between the mobile communication device and the recipient if the transmitted authentication code and the stored authentication code match within established tolerances. Finally, at the end of the communication, the stored authentication code is increased to reflect the additional usage of the mobile communication device for comparison upon receipt of the next service request message from the mobile communication device. Preferably, the authentication code consists of the cumulative duration of all calls completed by the requesting mobile communications device.

This method can be accomplished using an apparatus in accordance with the invention. Thus, a further aspect of the invention is an apparatus for mobile, wireless communication with a remote recipient comprising (a) a first storage device having stored thereon an authentication code consisting of a cumulative total of the prior usage of the apparatus;

(b) means for transmitting a request for service message to a central processing facility, said request for service message including an identification code specific to the mobile communication device and the authentication code;

(c) means for updating the authentication code stored on the first device to reflect the completion of each additional communication using the apparatus.

DETAILED DESCRIPTION OF THE INVENTION

Figure 1A:
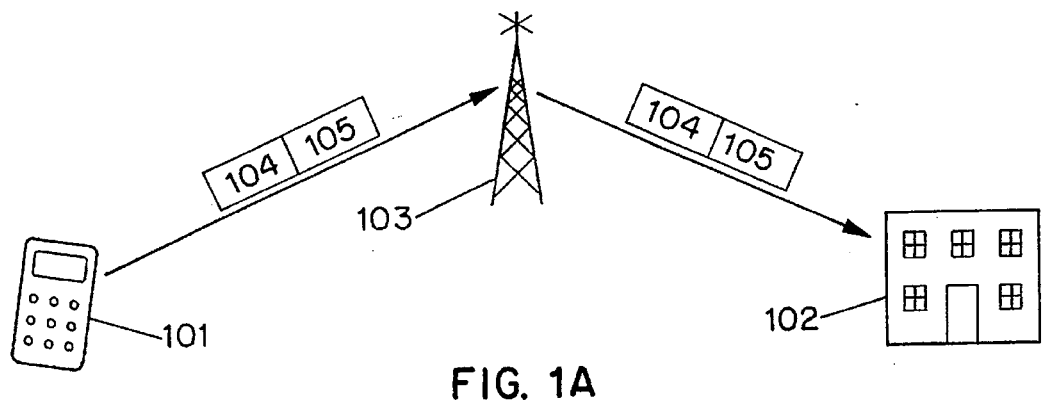
FIGS. 1A–1C shows a schematic representation of communication between a mobile communication unit and a central processing facility in accordance with the invention.

FIG. 1 shows one embodiment of the method of the present invention in schematic form. As shown in FIG. 1A, when the user depresses the send key to initiate communication with a designated remote location, the mobile communication device 101 transmits not only the identification of the remote location but also a request for service message to a central processing facility 102 via a mobile communication antenna/repeater 103. The request for service message has two parts: an identification code 104 which identifies the particular mobile communication device requesting service and an authentication code 105. In accordance with the present invention, the authentication code 105 consists of a number reflecting the cumulative prior usage of the particular mobile communication device making the request. Thus, every request for service message will be unique.

Figure 1B:
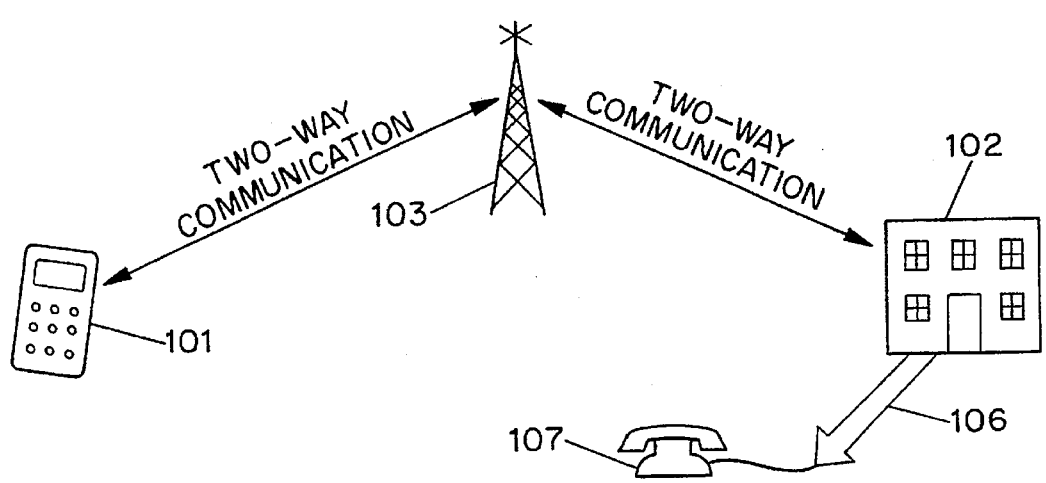

After receiving the request for service message, the system uses the identification code 104 to look up a stored authentication value for the mobile communications device requesting service. If the transmitted authentication code 105 is in predetermined relationship to the stored authentication value, the central processing system establishes two-way communication between the mobile communication device 101 to the designated remote location 107, for example via telephone land lines 106 as shown in FIG. 1B.

During the communication between the mobile communication unit 101 and the designated remote location 107, the central processing facility 102 keeps track of the duration of the communication. When the communication is terminated, the central processing facility 102 updates the stored authentication value to reflect the duration of the communication. At the same time, the mobile communication device 101 stores or completes storage of a new authentication code, increased to reflect the duration of the communication in the same manner as the stored authentication value at the central processing facility 102.

Those skilled in the art will appreciate that the method according to the invention advantageously requires very little computational or data-storage burden in the cellular telephone itself. For example, most cellular telephones now in use already contain a storage location for cumulative usage, and the software associated therewith already maintains such a cumulative total.

Those skilled in the art will appreciate that in the simplest case, the authentication message passed from phone to system would be simply the cumulative usage time, transmitted unencrypted. A system designer could, however, quite readily devise alternative ways of communicating information indicative of the cumulative usage. A simple case would be to communicate the difference between the cumulative usage and some very large number, so that the authentication message would be a number that grows smaller with time rather than larger. Yet other obvious variants could be devised, such as an encrypted communication of the cumulative usage or communication of less than all of the usage number (e.g. the first few or last few digits of that number).

It will be appreciated that the storage of a new authentication code in the mobile communication device can be accomplished in several ways. For example, the duration of the call can be monitored and stored in a register and added to the stored authentication code at the end of the communication. Alternatively, the stored authentication code can be incremented constantly from the point in time when the communication is initiated until the termination of the communication. This latter approach is preferable, since it alleviates the need for special handling in the event of an abnormal termination, such as would occur if the communication were terminated by turning off the power to the mobile communication device, loss of signal from the antenna/repeater or battery failure.

Figure 1C:
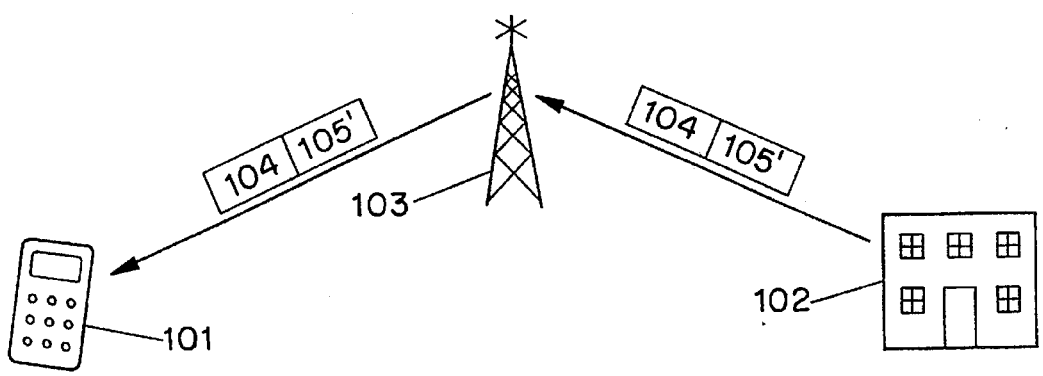

A third option for updating of the stored authentication code is the transmission of an updated authentication value from the central processing facility 102 to the mobile communication device 101 as shown in FIG. 1C. In this case, at the end of a communication, a termination signal is transmitted consisting of the identification code 104 and an updated authentication code 105'. This option provides for the least discrepancy between the stored values in the mobile communication device 101 and the central processing facility 102, but does not permit an update in all instances of abnormal termination. Thus, this option is preferably used in combination with an updating system residing solely within the mobile communication device.

As will be apparent from the foregoing discussion, there is a possibility for some discrepancy between the authentication code stored in the mobile communication device and the authentication value stored in the central processing facility, even in the absence of fraud. For example, discrepancies between the clock functions of the two systems may produce discrepancies in the stored values. It is therefore desirable to have a pre-defined tolerance or threshold for identifying a fraudulent call rather than requiring an exact match.

Yet another possibility for a discrepancy is that the cellular telephone may happen to be moved to a "roaming" location, and the host system in that location may either (1) not employ the system according to the invention at all or (2) employ the system according to the invention but fail to forward usage information promptly (or at all) to the "home" system.

In addition, in order to avoid accumulation of a discrepancy over time, it is advantageous to periodically update one of the stored values to actually match the other. One approach to achieving this is the transmission of an updated authentication code to the mobile communication device as shown in FIG. 1C. It is equally possible, however, to adjust the stored authentication value in the central processing facility to match the received authentication code periodically or at the beginning of each communication authorized.

Figure 2:
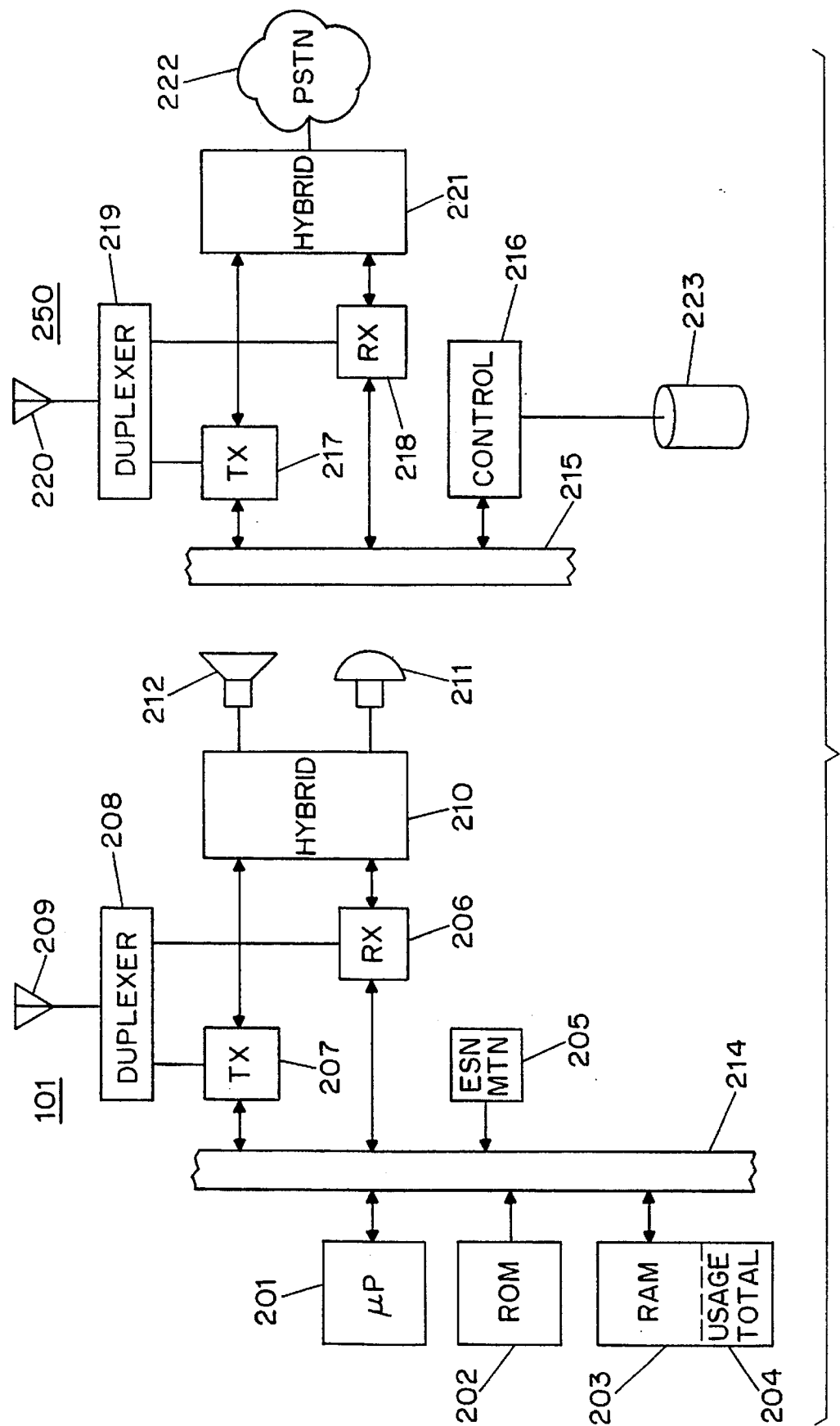
FIG. 2 shows an apparatus in accordance with the present invention.

FIG. 2 shows the hardware of the system according to the invention in greater detail. Cellular telephone 101 is shown, which includes a microprocessor 201 which communicates with other elements of the telephone via digital bus 214. The processor 201 executes a stored program in ROM 202. RAM 203, some or all of which may be nonvolatile, is provided for use by the processor in executing its stored program. Among other things, the RAM 203 may have a region 204 set aside to store the usage total. Also provided is a storage location 205 for the Electronic Serial Number (ESN) and the Mobile Telephone Number. Under program control, the processor 201 turns transmitter 207 and receiver 206 on and off, sets their respective frequencies, and turns on and off the respective audio paths to the hybrid audio circuitry 210. The audio circuitry 210 is connected to earpiece 212 and microphone 211. A duplexer 208 minimizes coupling between transmitter 207 and receiver 206 and maximizes coupling between each of them and the antenna 209.

The cell site 250 has an antenna 220, which in urban areas is typically a gain antenna. It is connected with duplexer 219 which has function much like that of duplexer 208. Software-controlled transmitter and receiver 217 and 218 are controlled by controller 216 over digital bus 215. Controller 216 is typically a processor executing a stored program, according to the invention. Mass storage 223 is shown which contains the authentication codes used according to the invention. For purposes of illustration a single cell site is depicted but it is understood that there are actually a multiplicity of cell sites, and they share the mass storage 223 or have continuously updated copies of it.

Transmitter 217 and receiver 218 are coupled via hybrid analog circuitry 221 and control circuitry, omitted for clarity in FIG. 2, to the public switched telephone network 222.

When used in accordance with the present invention, the transmitter 207 transmits a request for service message which includes the ESN and the cumulative usage total stored in the RAM 203. The processor 201 maintains a count of the additional usage time, and updates the stored value in region 204 of the RAM 203 at the end of the communication.

I claim:

1. A method for authenticating a request for communication service between a mobile communication device and a recipient comprising the steps of:
   (a) receiving a request for service message from the mobile communication device at a central processing facility, said request for service message including an identification code specific to the mobile communication device and a transmitted authentication code that reflects the cumulative duration of prior communications made using the mobile communication device;
   (b) comparing the transmitted authentication code to a stored authentication code that reflects the cumulative duration of prior communications for the mobile communication device stored in the central processing facility;
   (c) initiating communication between the mobile communication device and the recipient if the transmitted authentication code and the stored authentication code match within pre-defined tolerances; and
   (d) at the end of the communication, increasing the stored authentication code to reflect the additional usage of the mobile communication device and storing the increased authentication code for comparison upon receipt of the next service request message from the mobile communication device.

2. A method according to claim 1, further comprising the step of replacing the stored authentication code with a modified authentication code which is an exact match for the transmitted authentication code prior to the initiation of communication if the transmitted authentication code and the stored authentication code match within the pre-defined tolerances.

3. A method according to claim 1, further comprising the steps of transmitting the increased stored authentication code from the central processing facility to the mobile communication device at the end of the communication and storing the increased authentication code in the mobile communication device for transmission as the transmitted authentication code with the next request for service.

4. A method for conducting cellular communication from a mobile communication unit, comprising the steps of:
   (a) retrieving a stored authentication code consisting of the cumulative duration of prior communications made using the mobile communication unit from a storage means within the mobile communication unit;
   (b) transmitting a request for service message from the mobile communication unit to a central location, said message including the stored authentication code to initiate communication;
   (c) monitoring the progress of the communication using monitoring means within the mobile communication unit to detect initiation and termination of the communication and to define an incremental usage value for the duration of the communication; and
   (d) after termination of the communication, storing a new authentication code in the storage means within the mobile communication unit which reflects a new cumulative duration of prior communications made using the mobile communication unit and which is the sum of the stored authentication code and the incremental usage value.

5. A method according to claim 4, wherein the mobile communication unit periodically increases the stored authentication code throughout the communication.

6. A method according to claim 5, wherein the mobile communication device receives an updated authentication code from the central location at the end of the communication and wherein the updated code is saved as the new authentication code.

7. A method according to claim 4, wherein the mobile communication device receives an updated authentication code from the central location at the end of the communication and wherein the updated code is saved as the new authentication code.

8. An apparatus for mobile, wireless communication with a remote recipient comprising
   (a) a first storage device having stored thereon an authentication code consisting a cumulative total reflecting the duration of prior communications made using the apparatus;
   (b) means for transmitting a request for service message to a central processing facility, said request for service message including an identification code specific to the apparatus and the authentication code;
   (c) means for increasing the authentication code stored on the first device to reflect the duration of each additional communication completed using the apparatus.

* * * * *